March 8, 1949.   W. R. POLYE ET AL   2,463,805
CONTROL DEVICE
Filed Nov. 10, 1944   2 Sheets-Sheet 2
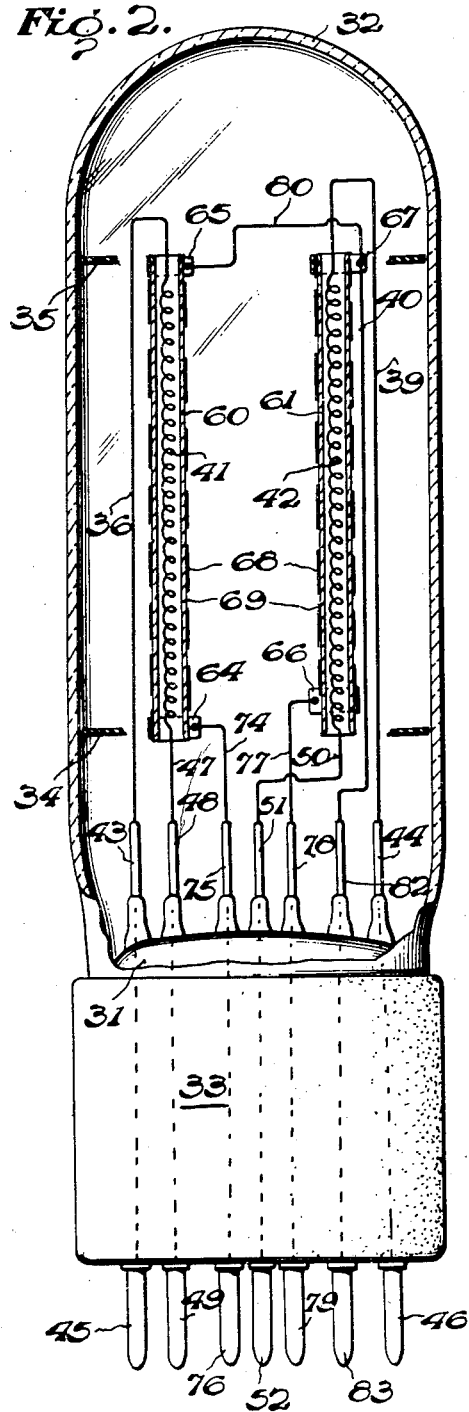
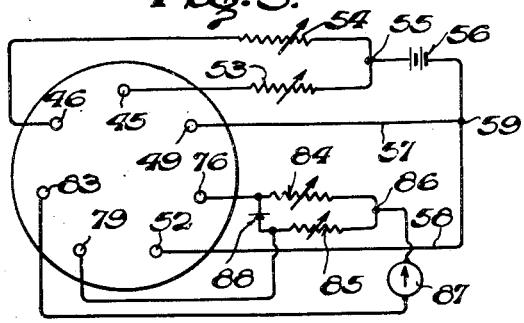
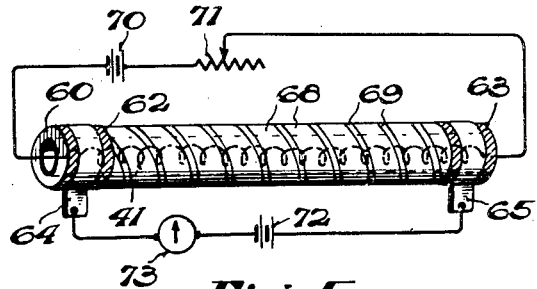
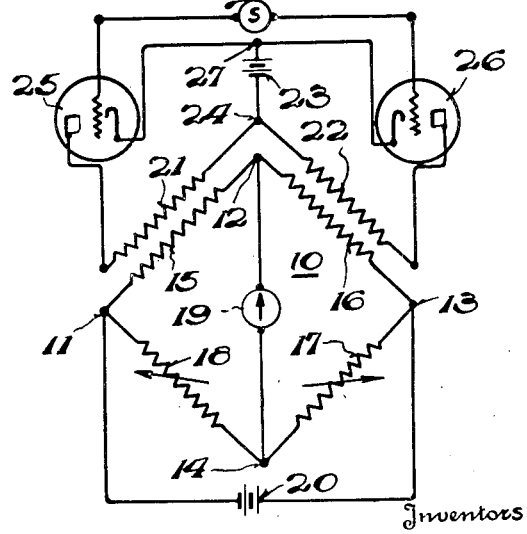
Inventors
William R. Polye
James R. Peek
By
Attorney Patented Mar. 8, 1949

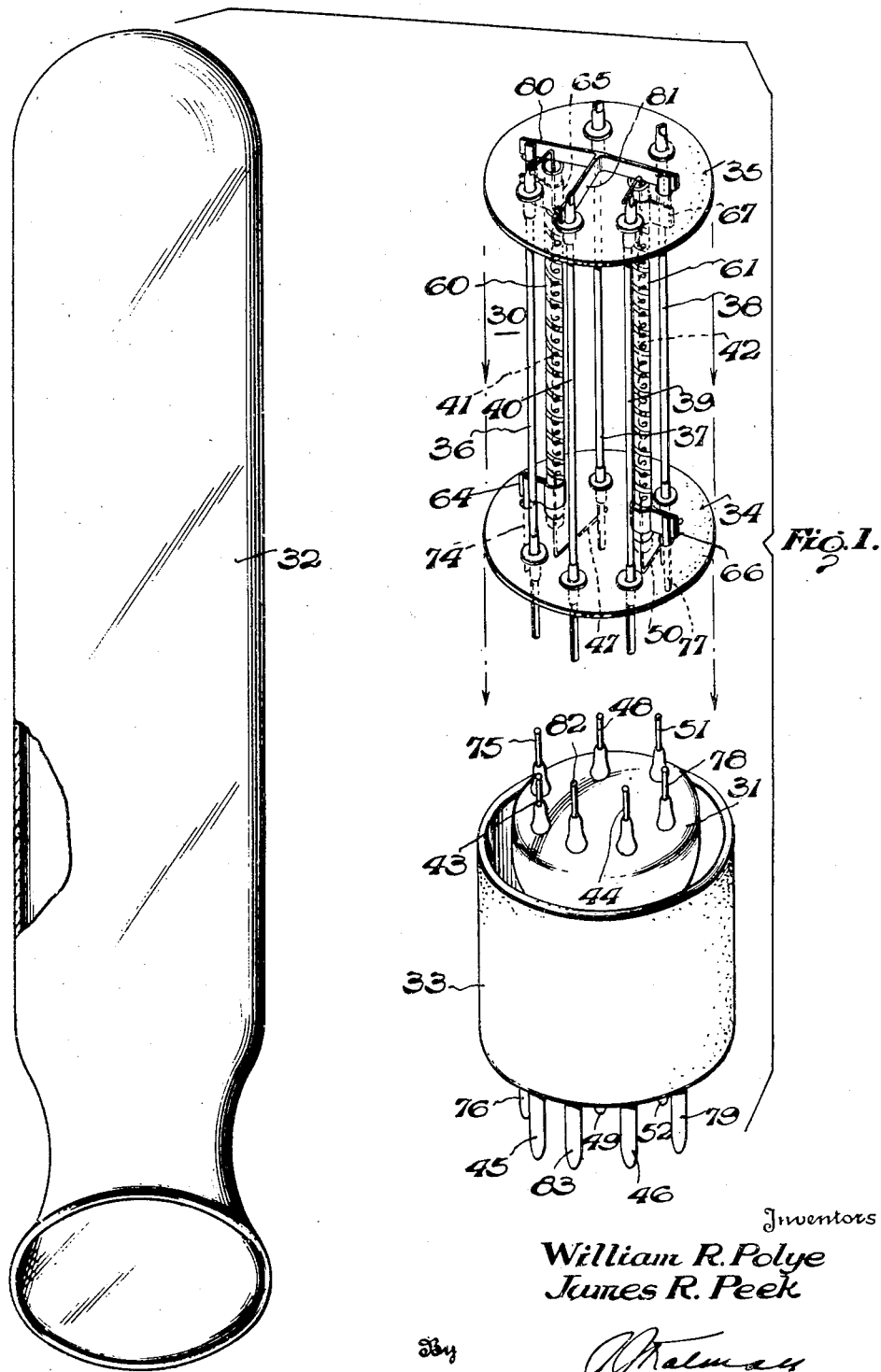

2,463,805

UNITED STATES PATENT OFFICE 2,463,805

CONTROL DEVICE

William R. Polye, River Edge, and James R. Peek, Ridgefield, N. J., assignor to Bendix Aviation Corporation, Teterboro, N. J., a corporation of Delaware Application November 10, 1944, Serial No. 562,826

9 Claims. (Cl. 201—63)

1

This invention relates to control devices generally and more particularly to an evacuated tube type of thermal control device.

It is often desirable in the operation of control devices such as automatic control devices, for example, to energize one circuit in response to the energization of a second circuit and to provide a time lag of a desired length between the response of the first circuit to the energization of the second circuit.

The present invention contemplates the provision of a new and novel coupling device adapted to operatively interconnect a controlled circuit with a controlling circuit and to provide a delay of any desired length of time in the response of the controlled circuit to the control circuit whether the controlled circuit be an A. C. or D. C. circuit or whether the controlling circuit be an A. C. or D. C. circuit. Moreover, the coupling device hereof is of such a character that in carrying out its intended function it develops no new and undesirable signal so that the controlled circuit when it responds does so only in accordance with the signal of the controlling circuit.

An object of the present invention, therefore, is to provide a novel coupling device of the character and for the purpose described.

Another object of the invention is to provide a novel coupling device between two or more interconnected circuits which will provide a desired time delay between the response of one circuit to another.

A further object is to provide a novel coupling device of the character described whose operating mechanism may be desirably supported within an evacuated envelope or tube.

Another object of the invention is to provide a novel thermal type time delay coupling device in the form of a vacuum tube.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

In the drawings, wherein like reference characters refer to like parts throughout the several views, Figure 1 is an exploded perspective view of the novel coupling device of the present invention;

Figure 2 is a more or less diagrammatic side

2 view in section of the device of Figure 1 with particular reference to the electrical hook-up of the various components;

Figure 3 is a bottom plan view of the device of Figure 1 together with the electric circuits therefor;

Figure 4 is a detail view illustrating the construction of a portion of the device of Figure 1; and, Figure 5 is an electrical wiring diagram illustrating the underlying principles of the device of Figure 1.

For a clearer understanding of the general principles underlying the operation of the novel coupling device of the present invention, reference is made to the electrical circuit of Figure 5 of the drawings wherein is illustrated a Wheatstone bridge circuit 10 having four taps 11, 12, 13 and 14, a resistor element 15 being connected between taps 11 and 12, a second resistor element 16 being connected between taps 12 and 13, a variable resistor 17 being connected between taps 13 and 14, and a second variable resistor 18 being connected between taps 11 and 14. Connected across one diagonal of the bridge as defined by taps 12 and 14 is a measuring or indicating instrument 19 while a suitable source of energy such as a battery 20, for example, is connected across a second diagonal of the bridge as defined by taps 11 and 13. As is well known with the use of such circuits, when resistor elements 15, 16, 17 and 18 are of a like value, there is no potential difference across taps 12 and 14 so that instrument 19 will indicate zero current flow. If, subsequently, the value of either resistor 15 or 16 is changed, a difference of potential will be developed and current flow will be indicated by instrument 19.

Arranged in heat exchange relation with resistors 15 and 16, are two similar resistors 21 and 22 connected at one end with a battery 23 through a common tap 24 and at their opposite ends with conventional tubes 25 and 26, the cathodes of which connect with the battery 23 through a common tap 27 and the grids of which are adapted for connection with any suitable source of variable current (not shown). Depending upon the value of current flowing in tubes 25 or 26, more current will be caused to flow through either resistor 21 or 22 so that the temperature of one or the other of the latter resistors will be raised and ultimately, due to heat radiation, the value of either resistor 15 or 16 will be changed to thereby unbalance and provide current flow in the bridge circuit.

The novel thermal coupling device of the present invention, operating in accordance with the general principles discussed above, is shown in Figure 1 as generally comprising a cage 30 embodying the operative mechanism hereof, a stem 31 associated with the cage, and a glass envelope or tube 32 enclosing the cage and stem which, after assembly, is evacuated and sealed in the well known manner. Surrounding the tube adjacent its base is an annular cap member 33 of insulating material having a series of prongs thereon for a purpose to presently appear.

Cage 30 comprises two spaced parallel mica discs 34 and 35 maintained together by virtue of five electrically conductive spacer elements 36, 37, 38, 39 and 40. Supported between the insulator discs 34 and 35 are two spaced coils 41 and 42 of resistance wire such as "Nichrome," for example, the upper ends of the coils connecting with spacers 36 and 39, respectively, whose lower ends are suitably connected with conductors 43 and 44 carried by stem 31, such conductors, in turn, being electrically connected with prongs 45 and 46 carried by cap 33. The lower end of coil 41, on the other hand, connects through a conductor 47 with spacer 37 which is electrically connected to a conductor 48 carried by stem 31, the conductor, in turn, being electrically connected with a prong 49 of cap 33 while the lower end of coil 42 connects through a conductor 50 with spacer 38 which is electrically connected to a conductor 51 carried by stem 31, the latter conductor, in turn, electrically connecting with a prong 52 of cap 33.

Coils 41 and 42 are an essential part of the controlling circuit of the coupling device of the present invention and as shown in Figure 3 such circuit is completed by connecting prong 45 with one side of a variable resistor 53 and prong 46 with one side of a second variable resistor 54, the opposite ends of both resistors connecting through a common tap 55 with one side of a battery 56, the opposite side of which connects with prongs 49 and 52 through conductors 57 and 58 and a common tap 59. The controlling circuit embodying coils 41 and 42, therefore, is similar to that part of Figure 5 which embodies resistors 21 and 22 and vacuum tubes 25 and 26 and it will be obvious that by varying the value of either resistor 53 or 54 more or less current will flow in resistance coils 41 and 42, so that the temperature of one having the greater current flow therethrough will increase.

Coupled in heat exchange relation with the coils 41 and 42 of the controlling circuit are hollow tubes 60 and 61 of novel and similar construction which constitute a part of the controlled circuit and comprise an essential part of the present invention. Tubes 60 and 61 are supported between discs 34 and 35 of cage 30 and surround coils 41 and 42, respectively, as shown in Figure 1. One of these tubes, i. e., tube 60, is shown in greater detail in Figure 4, and is constructed of electrically insulating material, such as glass, quartz, ceramic, etc., and is coated on each end with a layer of conducting material 62 and 63 such as gold, silver, etc. Metal straps 64 and 65 (tube 61 being provided with corresponding straps 66 and 67) are clamped firmly over the conducting layers 62 and 63 and define terminals for a conductive layer 68 deposited on the outer periphery of the tubes, such layer being preferably composed of material having a large temperature coefficient of resistance, such as nickel.

The conductive layer of the tubes is arranged in a novel manner in the form of a spiral with a spiral spacing 69 so as to be of high resistance and at the same time have sufficient thickness to be rugged and also occupy a short length of space. To this end, each tube, having mounted thereon the metal strap terminals and conducting end layers 62 and 63, is first wound with wire in spiral form down its length. Layer 68 is then deposited by evaporation in vacuum. The wire, during the evaporation step acts as a mask preventing the material from depositing in space 69 occupied by the wire. The wire is removed after the deposit is made and spiral spacing 69 thereby increases the effective length of the deposited film 68 many times, thus providing a film of high resistance.

Reference is now made to Figure 4 of the drawings for a clearer understanding of the purpose for the arrangement of coils 41 and 42 within hollow tubes 60 and 61. To this end, coil 41 may be connected in series with a suitable source of current 70 through a variable resistor 71 while conductive layer 68 may be connected in series through terminals 64 and 65 with a source of current 72 and a current meter 73 so that with resistor 71 set at a given value, a certain current will be maintained through coil 41 whereby the temperature of layer 68 will be maintained at a steady value which is a function of the temperature of coil 41 and the heat loss from layer 68. The resistance of layer 68, which is a function of the temperature of the layer, maintains a steady value, and meter 73 will indicate the current flowing through the layer. If the value of resistor 71 is decreased, the current through coil 41 is increased and the power dissipated in the coil increases giving a rise in temperature. Heat is thereupon transferred by radiation to layer 68 and its temperature is caused to rise. The time required for layer 68 to reach its maximum steady temperature may be predetermined to any desired value and depends upon the mass and material of tube 60, the gas surrounding the tube, and the pressure of the gas. Also, the final temperature of layer 68 is dependent upon the mass and material of tube 60, the gas and its pressure, and the emissivity of layer 68. As a result of temperature rise in layer 68 its resistance increases and meter 73 will indicate a lower value of current.

As better shown in Figures 1 and 2, hollow tubes 60 and 61, having coils 41 and 42 passing therethrough, are arranged between discs 34 and 35 so that lower strap 64 of tube 61 connects through a conductor 74 with a conductor 75 carried by stem 31, the latter conductor, in turn, being electrically connected with a prong 76 of cap 33 while lower strap 66 of tube 61 connects through a conductor 77 with a conductor 78 carried by the stem, the latter conductor, in turn, being electrically connected with a prong 79 of cap 33. The upper strap 65 of tube 60, on the other hand, connects through a conductor bar 80 with upper strap 67 of tube 61, a transverse conductor bar 81 connecting bar 80 with spacer 40 which is suitably connected to a conductor 82 of stem 31, the latter conductor being electrically connected with a prong 83 of cap 33.

The controlled circuit embodying hollow tubes 60 and 61 is better shown in Figure 3 as comprising a variable resistor 84 connected at one end to prong 76 and a second variable resistor 85 connected at one end to prong 79, the opposite ends of said resistors connecting through a common tap 86 through a current meter 87 with prong 83, while a source of current 88 is connected to the first ends of the resistors. The arrangement of the latter described controlled circuit is in the nature of a Wheatstone bridge similar to the part of the circuit of Figure 5 which contains fixed resistors 15 and 16 and variable resistors 17 and 18.

The manner in which the controlled circuit will respond with any desired time lag to a signal in the controlling circuit will now be obvious. Assuming currents of the same value passing through resistance coils 41 and 42, the temperature of both coils will be the same and the temperature change in conductive layers 68 of tube 60 and 61 will be the same so that the controlled circuit will be balanced. As soon, however, as the current flow within coil 41, for example, is increased and/or that through coil 42 is decreased, the temperature of coil 41 will increase thereby heating by radiation the conductive layer 68 of tube 60 to effectively increase the temperature of that layer while the temperature of coil 42 will drop thereby cooling off layer 68 of tube 61 whereupon an unbalanced condition is developed in the controlled circuit providing current flow in one direction or another depending upon which of coils 41 and 42 has more current passing therethrough, current flow in the controlled circuit, taking place, however, only after a certain lapse of time as determined by the constants of hollow tubes 60 and 61 as hereinabove described.

There has thus been provided a novel thermal coupling device in the nature of a vacuum tube with the use of which a desired and predetermined time lag may be developed between the response of a controlled circuit to the energization of a controlling circuit.

Although but one embodiment of the invention has been illustrated and described in detail, it is to be expressly understood that the invention is not limited thereto. Various changes can be made in the design and the arrangement of the parts without departing from the spirit and scope of the invention as the same will now be understood by those skilled in the art. For example, the power sources for the controlled circuits as well as those for the controlling circuits have been shown as batteries for simplicity, however, A. C. sources may be utilized equally as well or combinations of A. C. and D. C. sources. For a definition of the limits of the invention, reference will be had primarily to the appended claims.

We claim:

1. A thermal time delay device comprising an evacuated tube, means comprising a resistance coil arranged in said tube and adapted for generating heat in response to current flow therethrough, and means comprising an electrical conductor in the form of a substantially flat spiral sleeved about said coil and in heat conductive relation therewith whereby in response to a change in the temperature of said coil the resistance of said conductor is varied.

2. A thermal time delay device comprising an evacuated tube, means comprising a resistance coil arranged in said tube and adapted for generating heat in response to current flow therethrough, a hollow heat conductive tube sleeved about said coil, and a substantially flat spiral conductor deposited on said hollow tube whose resistance varies with the amount of heat generated by said coil.

3. A thermal time delay device comprising an evacuated tube, means comprising a resistance coil arranged in said tube and adapted for generating heat in response to current flow therethrough, a hollow heat conductive tube sleeved about said coil, and electrically conductive means in the form of a substantially flat spiral deposited on said hollow tube whose resistance varies with the amount of heat generated by said coil.

4. A vacuum tube comprising an evacuated envelope, a cage therein having insulated end pieces, means comprising a resistance element supported by said cage between said end pieces and adapted for generating heat in response to current flow therethrough, a hollow tube in heat exchange relation with said resistance element and supported by said cage between said end pieces, and electrically conductive means on said hollow tube whose resistance value varies in accordance with the heat generated by said resistance element.

5. A vacuum tube comprising an evacuated envelope, a cage therein having insulated end pieces, means comprising a resistance coil supported by said cage between said end pieces and adapted for generating heat in response to current flow therethrough, a hollow tube sleeved about said coil in heat exchange relation therewith and supported by said cage between said end pieces, and a spiral electrically conductive member carried by said hollow tube whose resistance varies in accordance with the heat generated by said resistance coil.

6. A time delay coupling device for interconnecting a controlling circuit and a controlled circuit, comprising a heat-generating coil arranged in said device and adapted for connection to said controlling circuit and forming a part thereof when connected thereto and also adapted to be connected to a source of current for energization thereby, a hollow tube sleeved about said coil in heat exchange relation therewith, and a substantially flat spiral electrical conducting resistor element on said hollow tube and adapted for connection to said controlled circuit for energizing the latter and forming a part thereof when connected thereto, whereby the resistance value of said resistor element changes in accordance with the energization of said heat-generating coil.

7. A time delay coupling tube for interconnecting a controlled circuit to a controlling circuit comprising a heat generating coil arranged in said tube and adapted for connection to one of said circuits and forming a part of the latter circuit when connected thereto, a source of current for energizing said coil, a hollow tube sleeved about said coil in heat exchange relation therewith, an electrical conducting resistor element arranged on said hollow tube whereby its resistance value changes in accordance with the energization of said coil and adapted for connection to the other of said circuits for energizing the last-named circuit, said resistor element being adapted to form a part of said last-named circuit when connected thereto.

8. A time delay coupling device for interconnecting a controlling circuit and a controlled circuit, comprising a sealed envelope, a pair of hollow tubes supported in spaced relation within said envelope, a pair of heat-generating coil elements adapted for connection to one of said circuits and forming a part thereof when connected thereto and also adapted for connection to a source of current for energization thereby, a pair of electrical conducting resistor elements adapted for connection to the other of said circuits for energizing said last-named circuit and forming a part of the latter when connected thereto, one of one pair of said elements being inside of one of said hollow tubes and one of the other pair of said elements being on the outside thereof, and the other element of said one pair of elements being inside of the other of said hollow tubes and the other element of said other pair being on the outside of said other hollow tube, whereby the resistance values of said resistor elements will vary in accordance with the energization of their associated heat-generating coil elements, and means electrically interconnecting said resistor elements within said sealed envelope so that when they are connected in the circuit of which they form a part they will form two arms of a Wheatstone-bridge circuit containing other resistor elements externally of said sealed envelope.

9. A time delay coupling device for interconnecting a controlling circuit and a controlled circuit, comprising a sealed envelope, a pair of heat-generating conductors mounted within said envelope for generating heat in response to current flow therethrough and adapted for connection to one of said circuits and forming a part thereof when connected thereto, a pair of electrical conducting resistor elements mounted within said envelope in heat conducting relation with said heat-generating conductors and adapted for connection to the other of said circuits and forming a part thereof when connected thereto, whereby the resistance values of said resistor elements will be varied in response to and in accordance with the heat generated by their associated heat-generating conductors, and means electrically interconnecting said resistor elements within said envelope so that when they are connected to the circuit of which they form a part they will form two arms of a Wheatstone-bridge circuit containing other resistor elements externally of said sealed envelope.

WILLIAM R. POLYE.
JAMES R. PEEK.

REFERENCES CITED

The following references are of record in the file of this patent:

UNITED STATES PATENTS

| Number | Name | Date |
|---|---|---|
| 1,694,264 | Hull | Dec. 4, 1928 |
| 1,844,149 | Evans | Feb. 9, 1932 |
| 2,036,071 | Mucher | Mar. 31, 1936 |
| 2,160,823 | Black | June 6, 1939 |
| 2,178,548 | Black et al. | Nov. 7, 1939 |
| 2,236,624 | Littwin | Apr. 1, 1941 |
| 2,280,257 | Pearson | Apr. 21, 1942 |
| 2,293,045 | Crowell | Aug. 18, 1942 |
| 2,344,298 | Green | Mar. 14, 1944 |